March 24, 1964 A. M. GOODLOE 3,126,440

SHIELDING AND SEALING GASKET MATERIAL

Filed June 27, 1961 2 Sheets-Sheet 1

ALFRED M. GOODLOE INVENTOR

BY Richard H. Nagel

ATTORNEY

ALFRED M. GOODLOE INVENTOR

BY Frank A. Ginnock

ATTORNEY 3,126,440
SHIELDING AND SEALING GASKET MATERIAL
Alfred M. Goodloe, 105 Duncan Hill Apts., 1000 Central Ave., Westfield, N.J.
Filed June 27, 1961, Ser. No. 120,074
7 Claims. (Cl. 174—35)

Figure 1:
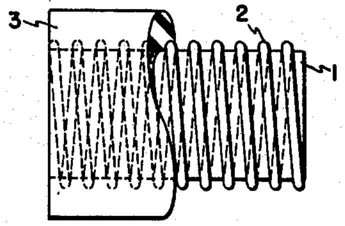

This invention relates to improvements in shielding and sealing gaskets for electronic equipment. More particularly, this invention relates to superior gaskets which will efficiently prevent electrical energy of radio frequencies from escaping at joints in closed containers and which will at the same time provide a gas tight seal at said joints. Most particularly, this invention relates to gaskets having superior properties to those previously known which also may be economically manufactured commercially and to methods for producing these gaskets.

Metal high frequency shielding gaskets or the like formed from knitted or woven wire mesh, which provide a bridging but non-continuous metallic contact as to the individual strands between abutted members of metallic shielding enclosure members within which electronic apparatus is housed are the gaskets most widely used today. Such all metal shielding gaskets are not adapted to provide a seal against moisture, dust, etc. and additionally have only poor shielding properties. Attempts have commercially been made to utilize woven wire shielding gasket structures impregnated with a sealing substance, such as natural or synthetic rubber, or other plastic having resilient characteristics, but such sealing substances either so coated the metallic strands of the gasket structure, or the strands, due to their lack of resiliency, interrupted the full continuity of the bridging metallic material between abutted shielding enclosure members, so that the shielding effect of the gasket was lost. As is well known, even finely machined metal surfaces are composed of myriad hills and valleys so that in the absence of resilient metal gaskets contacting is made, for example, only at the three high points.

In the present inventor's prior patent, U.S. 2,674,644, there was described a novel construction shielding gasket which not only provided necessary resilient metallic bridging contact between the members of the shielding enclosure but also provided a resiliently compressible sealing body effective to exclude water, dust, maintain pressure in aircraft equipment, etc., without interfering with or impairing the high frequency shielding effect of the gasket. Thus, the shielding and sealing gasket was produced from tubular or flat knit metallic wire mesh, through which mesh a thin sheet of uncured rubber had been pressed so that the mesh openings were filled with the rubber. A suitable number of such rubber filled knitted metallic mesh layers were superimposed to provide a body thickness equivalent to the desired radial width of gasket to be produced, and then the assembled layers were consolidated by vulcanization into a unitary body. From the body thus produced gasket bodies of desired thickness were cut away, the cut being made perpendicular to the layers of mesh so as to pass axially through successive mesh courses. Thereby wire strands were provided extending uninterruptedly across the thickness of the gasket body from one face thereof to the other. However, the path was tortuous and as will be developed below, (1) rebroadcasting of interference was obtained due to the presence of conductors parallel to the flange surfaces, and (2) insufficient angle with the surfaces was provided for biting through the oxide film on the flanges. Nevertheless this gasket is commercially used and was the best shielding and sealing gasket known until recently work done for the U.S. Air Force by Armour Institute indicated that gaskets having considerably superior shielding properties could be developed.

According to tests made by the Armour Institute, it was found that the most satisfactory type of shielding for suppressing radio noise was where there existed a multiplicity of small wires insulated from each other and having a suitable shape and placed in a position so that each end of each wire would bite into or break into the oxidized film on each part of the closing members or flanges. It was further disclosed that mechanical isolation and insulation of the wires was necessary since any conductors extending parallel to the flange surfaces acted as antennae to conduct radio frequency electrical energy to the outside of the container (where it is of course efficiently radiated). While the gasket discovered by the Armour Institute from a shielding standpoint was very good, the method described for making the gasket was thoroughly impractical and so far as is known the gasket was never commercially manufactured. This method (described in U.S. 2,885,459) involved impregnating card cloth (a material used in the textile industry for carding e.g. wool) with rubber and then cutting off the exposed wire ends closely adjacent to the front and back surfaces of the rubber. Unfortunately, with the soft rubber required for resilient sealing the wires which in said card cloth contained a single angle bend tended to rotate under the pressure applied in the cutting step. This caused contacting between wires and thus undesirable conduction of radio frequency energy to the outside of the shielding container. This was also true of the alternate method described, i.e. passing a rubber sheet through a stapling machine and then cutting off the staples on both sides to the desired length. Further, it was difficult to cut the wires off flush with the rubber. Patentees apparently failed to visualize any other means for obtaining a gasket where individual separated wires extended through the resilient material so as to be flush with or extending slightly from the two exposed surfaces.

The gasket of the present invention provides ways and means for securely holding or maintaining the multiplicity of individual wires in the desired position extending through the soft resilient gasket material.

In addition, in the present gasket material, it is very advantageous or extremely desirable that the wires within the gasket material are neither perfectly straight nor at right angles to the closing members or flanges as either of these would require too much pressure to give a complete sealing closure at all points around the gasket, i.e. as previously mentioned the surfaces of the flanges are not even. In the present gasket the wires are continuously curved and are at a slight angle off the vertical at the surfaces of the gaskets. They thus flex easily against the closing members and at the same time bite into the opposed flanges cutting through the oxide films. By "continuously curved" is meant having essentially no straight line segments.

The present invention will be more clearly understood from a consideration of the accompanying figures. FIGURES 1, 2, 8 and 9 describe one preferred embodiment of the present invention, FIGURES 3 through 6 and 10 describe another preferred embodiment and FIGURE 7 describes a final product made from the first-named preferred embodiment assembled into an annular gasket of circular or other shape.

Turning now to the first preferred embodiment of this invention, starting with either a round cross sectional area bar (or a round bar flattened on two sides parallel to each other) of resilient material, e.g. synthetic or natural rubber, or plastics of proper durometer which additionally are able to withstand required temperatures, a conducting metal wire made of a suitable metal or alloy is wrapped or spiraled around said material. Preferred resilient materials are silicone and neoprene rubbers which withstand the very cold temperatures encountered in jet aircraft applications. Preferred durometer numbers for the resilient materials are 25 to 75, more preferably 35 to 45, e.g. 40. In FIGURE 1 there is shown a side view of a bar of round cross section 1 wound with wire 2. The spiraling of the wire is preferably such that 14 to 36, more preferably 20 to 28, e.g. 28, spirals per inch of length are utilized. The size of the wires is preferably .0035 to .015, more preferably .0045 to .008, e.g. .006 inch. Preferred metals for the wires are the standard conductors. Particularly 70/30 brass is desirable since it bonds well to rubbers. Also, stainless steel and other alloys of a resilient character are particularly desirable.

After the wire has been spiraled on the bar another layer of the same or a different resilient material, e.g. the above described resilient materials, is extruded over the wrapped wire or applied by dipping. This coating is shown in FIGURE 1 and identified as 3. Where rubber is used the original bar may be cured or uncured, the layer covering the wire is usually uncured and the resilient layer is then in a preferred embodiment bonded to the original bar by heat. The purpose of covering the spiraled wire wrapped on the bar is to hold said wire in position during and after the next essential and final operation.

Figure 2:
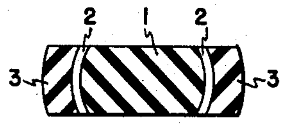

After the above described operations the round cross sectional area bar (or round bar flattened on two sides parallel to each other) is ground or otherwise machined on two sides parallel to each other (on the flattened sides if the flattened bar is used). This grinding removes the wire and rubber at the top and bottom but leaves a double row of curved wires extending between the top and bottom of the gasket as shown in FIGURE 2. Thus, this FIGURE 2 shows a cross sectional end view of the bar of FIGURE 1 after grinding (an exactly similar configuration is obtained with the flattened bar since the straight wire elements of the spiral on the flattened surfaces are removed in the grinding operation). Using the same reference numerals as in FIGURE 1, 1 represents the original bar, 2 the spiraled wire, and 3 the coated material placed over the bar wound with the wire. Thus, it can be seen that the wires extend from the top to the bottom of the gasket and protrude flush with the surface which enables them to bite into the flanges of the enclosure shield on the top and bottom and also provides two rows of such wires to provide a particularly efficient shielding. It should be noted that by using a flattened bar less rubber is required to be consumed in the grinding step. The thickness of the gasket is preferably 1/16" to 1/2", more preferably 3/32" to 1/4", e.g. 1/8". In general, within these ranges, thicker gaskets are used where flange surfaces are uneven.

Figure 8:
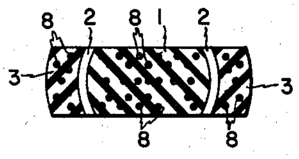
Figure 9:
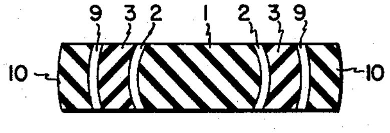

In another version of this first preferred embodiment, where more than two rows of wires are desired in the final gasket material this may be obtained by applying an additional spiral of wire on top of the layer of resilient material 3 covering the original spiral, and then applying another layer of resilient material on top of this spiral. Thus, in this embodiment four rows of wire will, of course, be obtained in the final flat gasket material. FIGURE 9 shows a cross sectional end view of such a bar after grinding. Using the same reference numerals as in FIGURE 1 and additional reference numerals, 1 represents the original bar, 2 the first spiraled wire, 3 the first coated material placed over the bar wound with the first spiraled wire, 9 an additional spiraled wire, and 10 an additional coating of resilient material over the said additional spiraled wire. This is advantageous for certain frequencies and for applications where additional bolt pressure can be applied against the closing members. Thus, the number of separated spirals of wire may be 1 to 3, e.g. 2. Additionally, referring to FIGURE 2, the space between the interior row of wires (i.e. depending upon the size of the orginial bar) is preferably 1/16" to 1", more preferably 3/32" to 1/2", e.g. 1/8" and the space between the interior wires shown and each succeeding spiral of wires is preferably 1/64" to 1/8", more preferably 1/16" to 1/8", e.g. 3/32". In another embodiment the original bar or the successive layers of resilient material may be reinforced with non-conducting fibers (preferably extending parallel to the length of the final gasket material) preferably monofilaments, e.g. polypropylene, polyethylene, nylon, etc. These fibers prevent the soft resilient material from stretching undesirably and additionally help to hold the wires in the desired position. Further, particularly where the fibers are present in the successive layers, the wires are held in place during the grinding operation. The number of fibers in the original bar or in successive layers be 1 to 100, e.g. 5. FIGURE 8 shows the embodiment described in FIGURES 1 and 2 additionally reinforced with nonconducting fibers 8 extending parallel to the length of the bar. The additional reference numerals are applied as in FIGURES 1 and 2, i.e. 1 represents the original cylindrical bar, 2 the spiraled wire, and 3 the coated material placed over the bar wound with wire.

Figure 3:
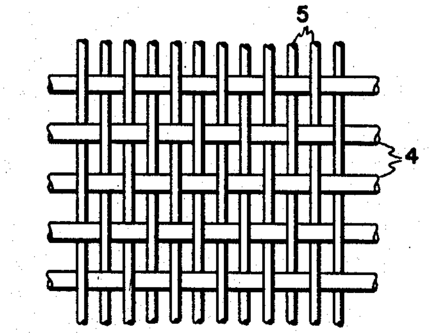

In the second preferred embodiment of this invention the shielding and sealing gasket material is produced by first starting with a woven material as shown in FIGURE 3. The essential feature of this material is that the warp 4 is made of a non-metallic strand such as a plastic or other non-conducting material, e.g. polyethylene, polypropylene, nylon, etc., and the woof 5 is made of a suitable metallic material such as stainless steel, brass or a suitable alloy, e.g. 70/30 brass. Again, to get the best results the woof wire should be of a size .0035 to .020, preferably .0045 to .011, e.g. .006 inch, and spaced about 8 to 35, preferably 24 to 32, e.g. 28 per inch. The spacing of the warp non-metallic strands and their size may be selected to give the proper curvature to the woof wire, the purpose being to make the entire gasket resilient so that heavy bolt pressure on the flanges will not be required. Suitable sizes of warp strands are preferably .008 to .050, more preferably .018 to .040, e.g. .024 inch and spacing preferably 5 to 30, more preferably 10 to 24, e.g. 18 strands per inch.

Figure 4:
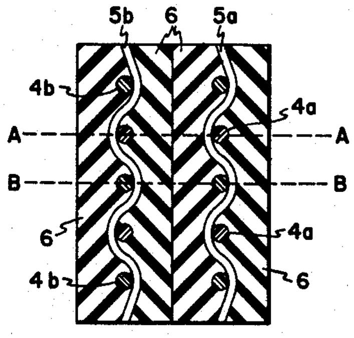
Figure 5:
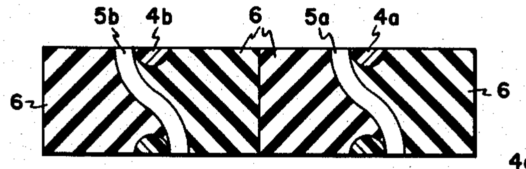
Figure 10:
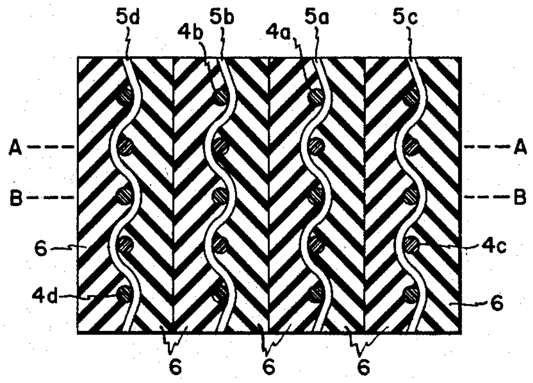

After suitable woven material is produced as discussed above it is then coated on both sides with a suitable resilient material of the types described above, e.g. rubber. This resilient material also fills the interstices between the wires. Ordinarily, at least two layers of coated woven wire are bonded together to give a material as described in cross sectional end view for two layers in FIGURE 4 and for four layers in FIGURE 10. In other embodiments 1 to 4, e.g. 2, layers may be used. Referring to FIGURE 4, the warp non-metallic strands are identified as *4a* and *4b*, the woof wires are identified as *5a* and *5b* and the resilient material is identified as 6. Referring to FIGURE 10, the warp nonmetallic strands are identified as *4a*, *4b*, *4c* and *4d*, the woof wires are identified as *5a*, *5b*, *5c* and *5d* and the resilient material is identified as 6. The average distance between the separate layers of warp wires is preferably 1/16" to 1", more preferably 3/32" to 1/2", e.g. 1/8". It should be noted that in the embodiments shown in FIGURES 4 and 10 the layers are positioned so that the bends in the woof wires are complementary. The opposite or intermediate arrangements may, of course, also be used. This material is then sliced parallel with the non-metallic strands as shown by dotted lines AA and BB to obtain a flat strip containing wires of continuously curved more or less S shape as shown in FIGURE 5, cross sectional end view of the embodiment shown in FIGURE 4. Again "continuously curved" has the meaning above described. In FIGURE 5 the warp non-metallic strands are identified as *4a* and *4b* and the woof wires as *5a* and *5b*. Again the resilient material is identified as 6. The thickness of the gasket material may be 1/16" to 1/2", preferably 1/8" to 3/16", e.g. 1/8" and less preferably may contain a greater or less length of the continuously curved woof wire than shown. It should be noted that the warp strands cause a bend to be put into the woof wires and additionally help to hold the woof wires in the desired position during and after being impregnated with rubber. Additionally, the advantages described above in connection with the first preferred embodiment as to preventing undesirable stretching of the soft resilient material, holding the wires in the desired position in the final gasket material and during cutting, etc. are also obtained.

Figure 6:
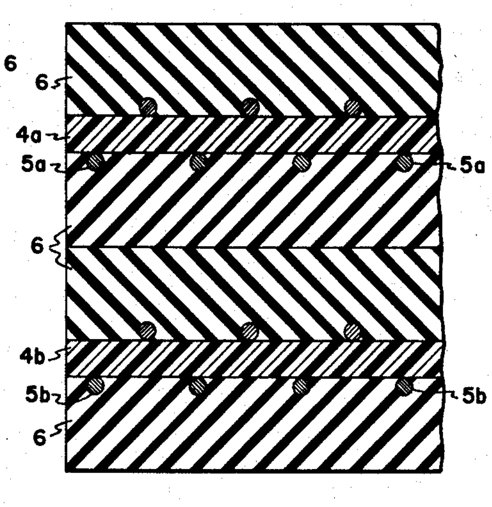

Another view of the material, this time looking down in the position in which the material would be sandwiched between the two flanges of the shield is shown in FIGURE 6. Here the woof wires 5*a* and 5*b* are shown disappearing into the resilient material 6 and the warp nonmetallic strands are shown as 4*a* and 4*b*.

Figure 7:
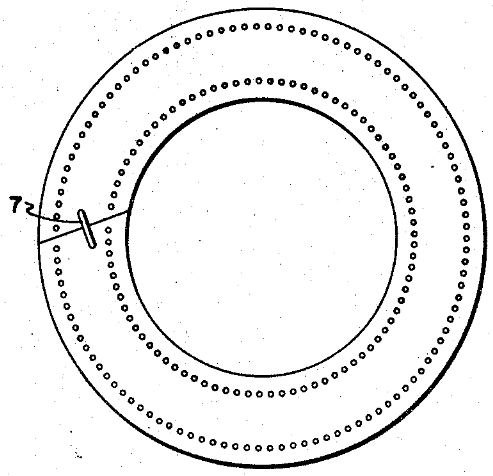

Finally, referring to FIGURE 7, a preferred final gasket is shown made of the strip material shown in FIGURE 2. For the strip material shown in FIGURE 6 a similar gasket (not shown) having four rows of wires is obtained. Thus, the strip material is bent edgewise into the annular circular gasket shown. Since little holding pressure is required the resilient base material preferably cut at an angle may be joined by hook 7 and cemented. Thus, the hook holds the shape until the rubber cement sets or cures. The thickness of the gasket is of course determined by the thickness of the strip used to form the gasket.

In some instances there may be a problem of attaching the gasket to covers onto round, square or rectangular flanges. These problems may be avoided by making a gasket of sufficiently large flange width so that small bolts can be put between the rows of protruding wires. In other instances it may be more practical and cheaper to make the gasket material and then bond this to rubber or metal flanges with bolt holes provided within these flanges. Of course, the thickness of the sealing and shielding gasket should be slightly thicker than the material with bolt holes bonded to it so as to always be sure of good contact on the wires and the shielding member and also to provide a gas tight seal.

It is to be understood that this invention is not limited to the specific embodiments described above and that modifications may be made without departing from the spirit of the invention.

What is claimed is:

1. A gasket for the purposes described comprising a flat strip of resilient plastic substance having contained therein at least one sheet of woven material perpendicular to the flat sides of said strip, the woof threads of the said woven material running approximately perpendicular to the said flat sides and being of a metallic electrically conducting material and the warp threads of said material running approximately parallel to the surfaces of said strip and being of a non-metallic, non-conducting material.

2. The gasket of claim 1 in which the flat strip of resilient plastic substance contains 1 to 4 sheets of the woven material all spaced parallel to and separate from each other and aligned with the metallic woof threads running approximately perpendicular to the flat side of the said strip.

3. The gasket of claim 2 in which the sheets of the woven material are spaced $\frac{1}{16}$ inch to 1 inch from each other, and in which in each sheet of the woven material the woof threads are spaced 8 to 25 per inch and the warp threads are spaced 5 to 30 per inch.

4. The gasket of claim 1 in which the thickness of the gasket is $\frac{1}{16}$ inch to $\frac{1}{2}$ inch.

5. The method for making a shielding and sealing gasket material which comprises spirally winding a metallic wire on a cylindrical bar of a resilient plastic substance, the spacing of the spiral being 14 to 36 turns per inch of length of the bar, coating the bar wound with wire with an additional layer of resilient plastic material, and machining the coated bar on two sides parallel to each other to thus form a thin gasket strip of material having two flat surfaces parallel to each other containing two rows of separate continuously curved wires extending through the said strip of material and being flush with the flat surfaces of the said strip of material.

6. The method for making a shielding and sealing gasket material which comprises spirally winding a metallic wire on a cylindrical bar of a resilient plastic substance, the spacing of the spiral being 14 to 36 turns per inch of length of the bar, coating the bar wound with wire with an additional layer of resilient plastic material, spirally winding another metallic wire on the coated bar, coating this bar wound with wire with another layer of resilient material, and machining the final coated bar on two sides parallel to each other to thus form a thin gasket strip of material having two flat surfaces parallel to each other containing four rows of separate continuously curved wires extending through the said strip of material and being flush with the flat surfaces of the said strip of material.

7. The method for making a shielding and sealing gasket material which comprises the steps of coating and impregnating sheets of woven material with a resilient plastic substance on both sides, the said woven sheets having the warp made of a non-metallic material and the woof made of a metallic electrically conducting material, bonding the said sheets oriented with the metallic woof wires approximately parallel together, slicing the bonded sheets perpendicular to the woof wires to obtain a thin strip of gasket material having the continuously curved woof wires extending through the said strips and being flush with the surfaces of said strips.

References Cited in the file of this patent

UNITED STATES PATENTS 2,885,459 Pulsifer et al. ------------ May 5, 1959